United States Patent
Smith, Jr.

(10) Patent No.: US 6,253,328 B1
(45) Date of Patent: *Jun. 26, 2001

(54) METHOD AND APPARATUS FOR SECURING PASSWORDS AND PERSONAL IDENTIFICATION NUMBERS

(76) Inventor: A. James Smith, Jr., 4901 Gulf Shore Blvd. North, Naples, FL (US) 34103

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,578

(22) Filed: Feb. 12, 1998

(51) Int. Cl.[7] .............................. H04L 9/32; H04L 9/18; G09C 1/06
(52) U.S. Cl. .............................. 713/202; 380/42; 380/56
(58) Field of Search ..................................... 713/202, 184; 380/37, 42, 46, 51–59; 283/17, 73

(56) References Cited

U.S. PATENT DOCUMENTS

| | | | |
|---|---|---|---|
| 312,665 | * | 2/1885 | Smith . |
| 4,184,148 | | 1/1980 | Smagala-Romanoff ......... 340/149 A |
| 4,734,040 | * | 3/1988 | North et al. .......................... 434/433 |
| 4,857,914 | | 8/1989 | Thrower .......................... 340/825.31 |
| 5,056,141 | | 10/1991 | Dyke ...................................... 380/25 |
| 5,177,789 | | 1/1993 | Covert ................................... 380/23 |
| 5,251,259 | | 10/1993 | Mosley ................................. 380/23 |
| 5,265,162 | | 11/1993 | Bush et al. ........................... 380/24 |
| 5,276,314 | | 1/1994 | Martino et al. ..................... 235/380 |
| 5,363,449 | | 11/1994 | Bestock ................................ 380/23 |
| 5,377,270 | * | 12/1994 | Koopman, Jr. et al. ............. 380/25 |
| 5,428,349 | | 6/1995 | Baker ................................ 340/825.3 |

OTHER PUBLICATIONS

Kak, Subhash, "The Aryabhata Cipher," Cryptologia, vol. XII, No. 2, Apr. 1988, pp. 113–117.*
Millikin, D.D., "Elementary Cryptography and Cryptanalysis," Aegean Park Press, 1943, pp. 4–13 and 70–82.*
James Raymond Wolfe, Secret Writing–The Craft of the Cryptographer, 1970.
Walt Babson, All Kinds of Codes, 1976.
Kenneth L. Higbee, Ph.D., Your Memory–How it Works and How to Improve it, 1977.
Francis Fauvel–Gouraud, D.E.S., The Art of Memory, 1845.
BYTE Magazine, The McGraw–Hill Co., Some Assembly Required, 1990.
Tony Buzan, Use Your Perfect Memory, 1984.

* cited by examiner

*Primary Examiner*—Tod Swann
*Assistant Examiner*—Justin T. Darrow
(74) *Attorney, Agent, or Firm*—Gibbons, Del Deo, Dolan, Griffinger & Vecchione

(57) ABSTRACT

A method for securing passwords and personal identification numbers utilizes a mastercode. At least ten characters are selected for the mastercode. The selected characters are randomly associated to a corresponding digit, wherein the association defines the mastercode. A numeric sequence is translated into a corresponding character sequence using the mastercode. The corresponding character sequence is expanded into an ordinary word. An apparatus for implementing the method is also described. For enhanced security the mastercode can be embedded within a mastergrid camouflaging the mastercode.

31 Claims, 3 Drawing Sheets

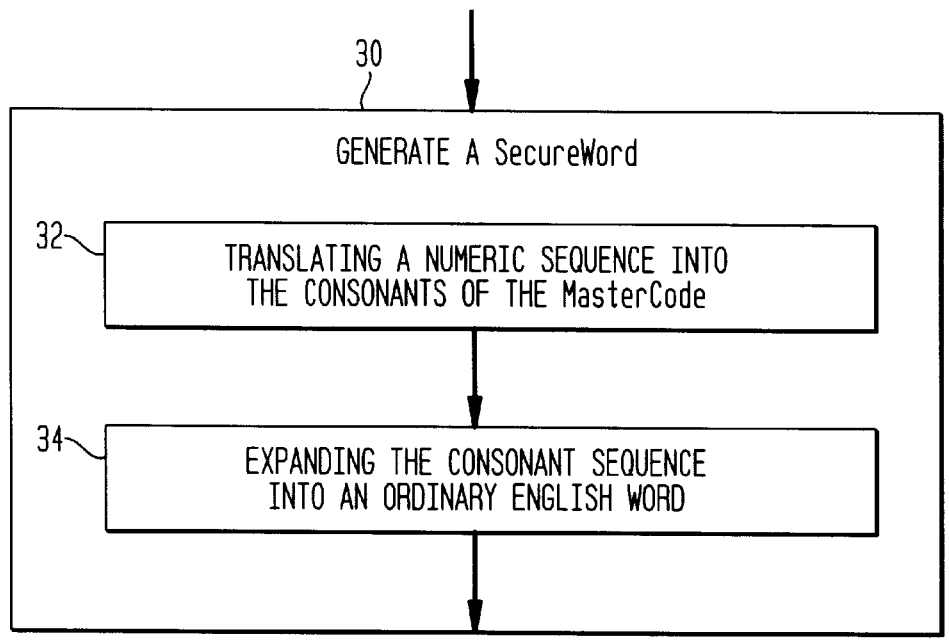
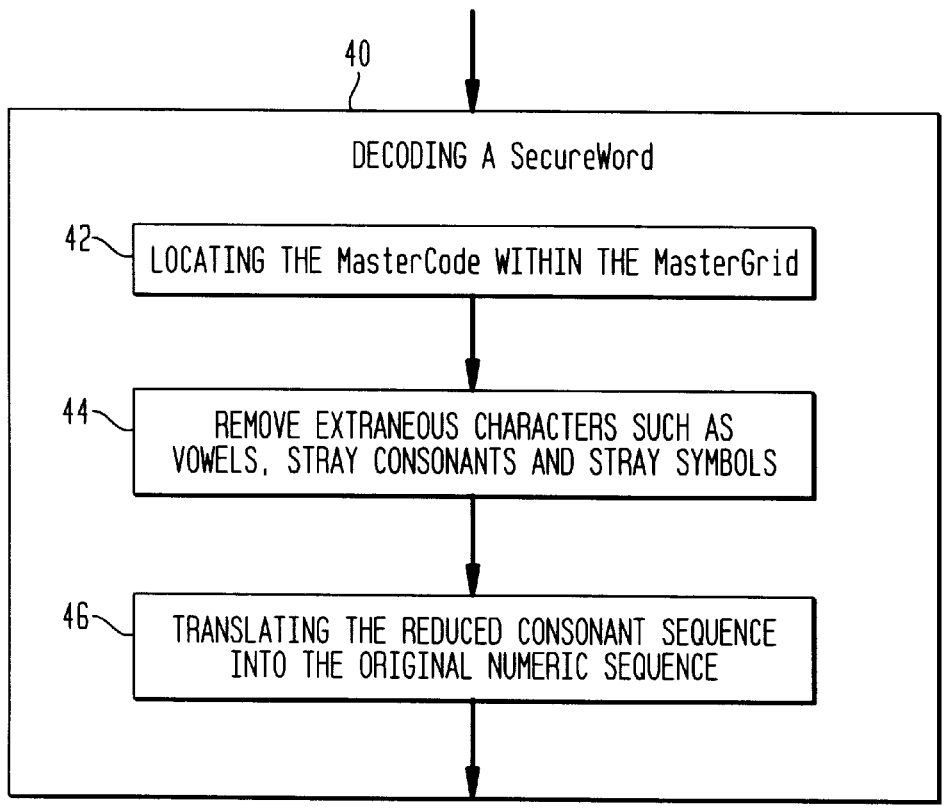

METHOD AND APPARATUS FOR SECURING PASSWORDS AND PERSONAL IDENTIFICATION NUMBERS

FIELD OF THE INVENTION

This invention relates to secured systems and more particularly to the encryption of passwords and personal identification numbers.

BACKGROUND OF THE INVENTION

Systems that are secured for use only by authorized individuals frequently rely upon a password or personal identification number (PIN). Examples of systems which utilize PINs include college registration, employee access to information, cellular phones and other communication devices in addition to savings and checking accounts, ATM transactions, telephone calling cards, debit cards, credit cards and numerous other systems.

While some individuals are able to remember random sequences of numbers and letters, most passwords and PINs are selected by the individual to have some personal relevance so that they can be easily remembered. Frequently, words and number combinations that relate to loved ones, pets, colleagues, birthdays, telephone numbers, addresses and social security numbers are used for passwords and PINs. Such associations provide hackers, thieves, spies and others with weaknesses that they can exploit in order to gain unauthorized access. Even when random words and numbers are used, they are frequently written in a list that is kept handy. The list of passwords and PINs is often not well secured itself, which also facilitates unauthorized access.

Individuals are faced with the dilemma of having a password or PIN that is easy to remember and consequently facilitates unauthorized access or having a password or PIN that is so difficult to remember that it may have to be written down, thus negating the added security.

SUMMARY OF THE INVENTION

The present invention is a method for securing passwords and personal identification numbers which utilizes a mastercode. At least ten characters are selected for the mastercode. The selected characters are randomly associated to a corresponding digit, wherein the association defines the mastercode. A numeric sequence is translated into a corresponding character sequence using the mastercode. The corresponding character sequence is expanded into an ordinary word or set of words. An apparatus for implementing the method is also described. For enhanced security the mastercode can be embedded within a mastergrid camouflaging the mastercode.

BRIEF DESCRIPTION OF THE DRAWINGS

A more complete understanding of the present invention may be obtained from consideration of the following description in conjunction with the drawings in which:

FIG. 2 is a flow chart of the steps involved in generating a SecureWord or set of SecureWords;

FIG. 3 is a flow chart of the steps involved in decoding a SecureWord; and

DETAILED DESCRIPTION OF VARIOUS ILLUSTRATIVE EMBODIMENTS

Figure 1:
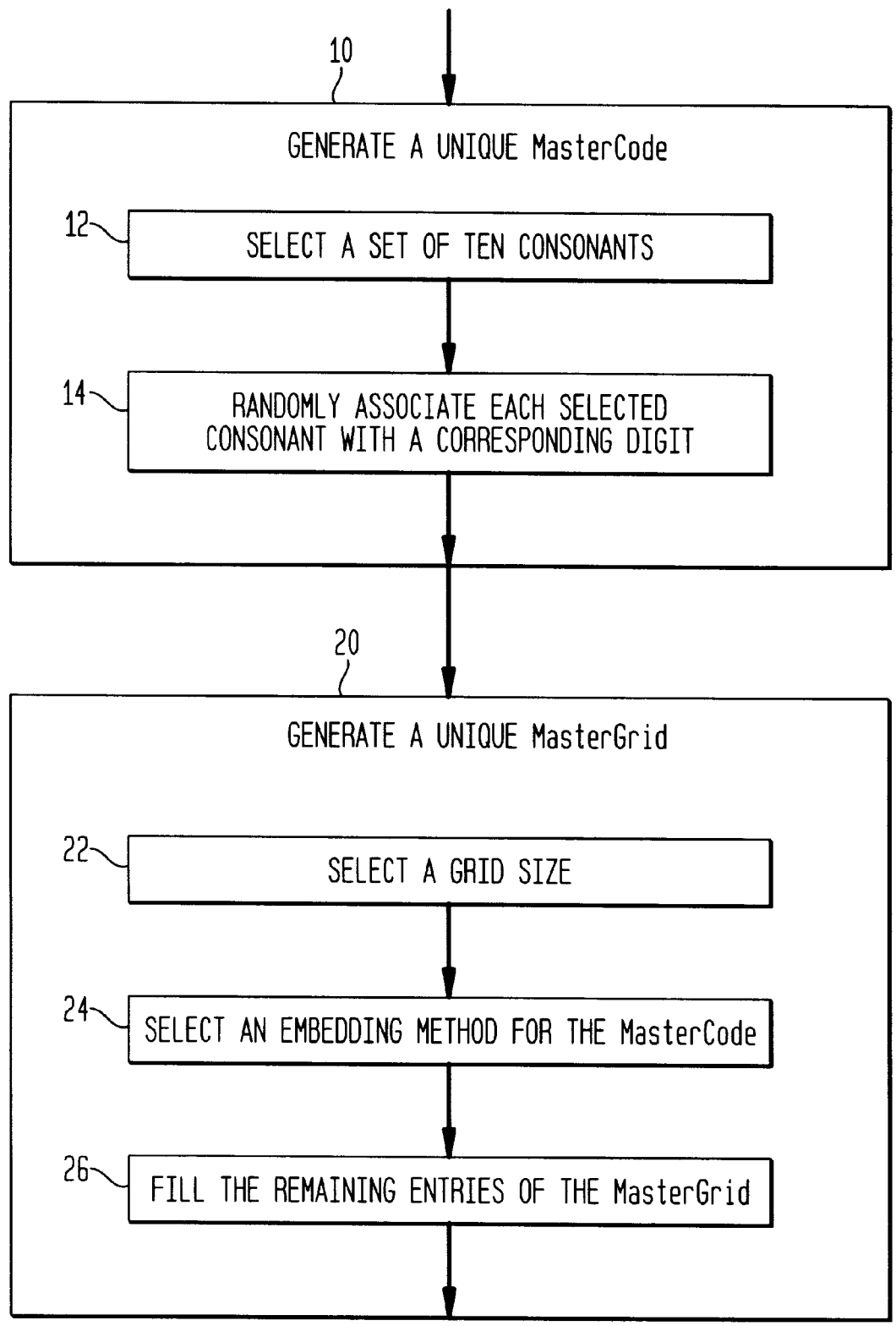
FIG. 1 is a flow chart of the steps involved in the SecureWord system for generating a MasterCode and a MasterGrid.

Although the present invention is particularly well suited for use with a password or personal identification number (PIN) and shall be so described, the present invention is equally well suited for use with other systems which require a sequence of numbers, letters, and/or other symbols for access.

Although the present invention is particularly well suited for use with the English language and shall be so described, the present invention is equally well suited for use with other character based languages.

Systems such as college registration, employee access to information, cellular phones and other communication devices in addition to savings and checking accounts, ATM transactions, telephone calling cards, debit cards, credit cards and numerous other systems rely on a password or PIN to secure access only by authorized individuals.

The dilemma of having a password or PIN that is easy to remember and consequently, facilitates unauthorized access; or having a password or PIN that is so difficult to remember that it may have to be written down, thus negating the added security, necessitates an alternative solution.

The problem of making numeric sequences easier to remember has long been of great concern. One of the earliest attempts to deal with this problem was the "figure alphabet" developed by Stanislus Winckelmann in 1648. This method, shown in Table 1, substituted consonants for each of the ten digits (one through nine and zero).

TABLE 1

| 1 | 2 | 3 | 4 | 5 | 6 | 7 | 8 | 9 | 0 |
|---|---|---|---|---|---|---|---|---|---|
| b | c | f | g | l | m | n | r | s | t |
| p | k | v | j |   |   |   |   | z | d |

This method created nonsense words which were then incorporated into a rhyming phrase.

Even with its limitations, an alternative to Winckelmann's method was not available until 1730 when Dr. Richard Grey, the Rector of Hinton, developed a method which also included vowels and diphthongs. Grey's methods assigned a consonant to each digit like the Winckelmann method, but additionally assigned a vowel or a diphthong to each digit, which is shown in Table 2.

TABLE 2

| 1 | 2 | 3 | 4 | 5 | 6  | 7  | 8  | 9  | 0 |
|---|---|---|---|---|----|----|----|----|---|
| b | d | t | f | l | s  | p  | k  | n  | z |
| a | e | i | o | u | au | oi | ei | ou | y |

Grey's method was refined by Gregor von Feinaigle in 1807. The refinement is shown in Table 3, where the more common consonants were assigned to the digits and the vowels were dropped. By dropping the formal relationship of the vowels to the digits a user can attempt to make actual words using any combination of vowels.

TABLE 3

| 1 | 2 | 3 | 4 | 5 | 6 | 7 | 8 | 9 | 0 |
|---|---|---|---|---|---|---|---|---|---|
| t | n | m | r | l | d | c | b | p | s |
|   |   |   |   |   |   | k | n | f | x |
|   |   |   |   |   |   | q | v |   | z |
|   |   |   |   |   |   | g | w |   |   |

An improvement to Feinaigle's methods was made by Aim Paris and Francis Fauvel-Gourand in 1822. The improvement is shown in Table 4 below where the assignments were reorganized so that any of the consonants with similar sounds can be used for the same digit and other letters are assigned based on visual similarities.

TABLE 4

| 1 | 2 | 3 | 4 | 5 | 6  | 7  | 8 | 9 | 0 |
|---|---|---|---|---|----|----|---|---|---|
| t | n | m | r | l | ch | k  | v | p | s |
| d |   |   |   |   | g  | ck | f |   |   |
|   |   |   |   |   | sh | q  |   |   |   |
|   |   |   |   |   |    | g  |   |   |   |

In 1844, Francis Fauvel-Gourand published an attempted classification of all of the words in the English language that could be used to represent numbers up to ten thousand.

The Paris/Fauvel-Gourand method has been advocated by numerous lecturers and writers for over a century. This method evolved into a method of analytic substitutions, which is shown in Table 5, where the digits are represented by the consonant sounds and not by the consonants themselves.

TABLE 5

| 1  | 2 | 3 | 4 | 5 | 6  | 7     | 8 | 9 | 0     |
|----|---|---|---|---|----|-------|---|---|-------|
| t  | n | m | r | l | j  | k     | f | p | z     |
| th |   |   |   |   | sh | q     | v | b | s     |
| d  |   |   |   |   | ch | $c_1$ |   |   | $c_2$ |
|    |   |   |   |   | $g_2$ | $g_1$ |   |   |     |

$_1$ hard sound
$_2$ soft sound

Unfortunately, this method of analytic substitutions, while it permits a user to remember a numeric sequence, such as a password or PIN which is so difficult to remember that it may have to be written down, suffers a limitation in providing a secure alternative. While the actual pin number is not written down, the analytic substitution method is well documented in popular literature, is easy to use, and thus is very prone to attack by hackers and others.

While the method of analytic substitutions and other methods make remembering a difficult sequence easier, the very solution compromises the security that was obtained from using the difficult sequence. Words and even phrases can be related to a series of numeric sequences, but when the association between them and the numbers become known, the security provided by the original numeric sequence is compromised. While this may be quite useful for remembering dates, telephone numbers, license plates, time schedules, prices, etc. the very ease of the system and its appearance in the popular literature compromises its use for any secure numeric sequence. Essentially, the words and phrases are not secure.

Ideally there should be a SecureWord which permits easy remembering of the secure numeric sequences without compromising their security. By creating a unique MasterCode a user can convert a random set of numbers into ordinary English words. Only the user knows how to translate the English words back into the PIN or password numeric sequence.

The SecureWord system is an encryption translation method for encrypting numeric symbol sequences (as well as alpha numeric sequences) and translating the encrypted numeric sequence into meaningful words, sets of words and phrases which are easy to remember and simple to decode. By randomizing the assignment of the character sequence a unique assignment is given to the numeric values. The character sequence corresponding to a particular numeric sequence can then be referenced to or scanned against a word list. (In this application the use of the term word list shall mean a traditional dictionary, word list, comprehensive word list, word generation algorithm, and other methods of validating words.) This character sequence is expanded with unassociated vowels and even false consonant letters to create ordinary English words, sets of natural language words and phrases. A computer can be used to translate the numeric sequence such as a PIN or password with the user's MasterCode and then scan the word list to locate all the words that fit the character sequence with unassociated vowels or consonants preceding, interspersed and following the characters of the character sequence. Since the system can locate all of the words fitting the letter sequence of the "converted" password, the system does not require any particular or specific character(s) relationship to any particular or specific digit(s). Thus all users can create their own MasterCode of letters and compound consonant sounds which will be then substituted for the numeric sequence. The MasterCode may include symbols as well as some vowels.

The present invention SecureWord system allows passwords to be comprised of totally random sequences. If any symbols are used to represent digits in a password, then the system ignores the symbol in locating words and then randomly inserts other symbols into other SecureWords in the list, thus masking the relevance of any specific symbol.

With the MasterCode being totally arbitrary it is difficult to memorize. Initially, some users may need to have both their MasterCode and their SecureWords written down. The list of SecureWords alone does not supply enough information to convert them back into the original sequence. However, having the MasterCode and the SecureWords would permit the decoding of the original sequences.

In order to protect the MasterCode, the SecureWord system produces a MasterGrid, such as a 5×5 grid, a 6×6 grid, or an n by m grid in which the MasterCode is masked or camouflaged among the remaining letters of the alphabet, numbers and even typewriter keyboard symbols. The ten characters of the MasterCode are arranged within the MasterGrid in a relationship only known to the user. The existence of grid codes for encryption actually enhances the security of the SecureWord system by actually aiding in the masking or camouflaging of the MasterCode. Grid codes date back to around 220 B.C. when a Greek named Polybius described a naval signaling code which actually involved the use of flares. They were arranged five on one side and five on the other side of the masthead. The signal system was based on the 5×5 grid shown in Table 6. Some subsequent grid codes replaced digits with letters. A given letter would be used only once in either direction (horizontal or vertical) but could be used in both directions.

TABLE 6

|   | 1 | 2 | 3 | 4  | 5 |
|---|---|---|---|----|---|
| 1 | a | b | c | d  | e |
| 2 | f | g | h | ij | k |
| 3 | l | m | n | o  | p |
| 4 | q | r | s | t  | u |
| 5 | v | w | x | y  | z |

A SecureWord system user can select words which are easy to remember or have a particular meaning from the computer generated list. The SecureWords may be memorized or recorded. The MasterGrid may be written and kept to allow the user rapid decoding of the SecureWords. For a better understanding of how the SecureWord system works, let us look at an exemplary embodiment. The digits 0, 1, 2, 3, 4, 5, 6, 7, 8 and 9 are randomly assigned to ten consonants which is shown in Table 7.

TABLE 7

| Digit | Sound |
|---|---|
| 0 | L |
| 1 | R |
| 2 | M |
| 3 | N |
| 4 | T |
| 5 | S |
| 6 | P |
| 7 | V |
| 8 | K |
| 9 | C |

This represents the MasterCode which can then be embedded into a MasterGrid such as that shown in Table 8.

TABLE 8

| L | R | M | N | T |
|---|---|---|---|---|
| A | H | Q | D | U |
| S | P | V | K | C |
| W | B | I | Y | E |
| F | Z | G | J | O |

Referring to Table 9 the MasterCode is shown found in the first and third lines of the MasterGrid with the corresponding numeric relationship. The MasterGrid when printed or written would only appear in the form that is shown in Table 8. The numeric corresponding numeric relationships would only be known to the SecureWord system user. Thus even having access to the actual MasterGrid and the SecureWords would not easily permit decoding of the SecureWords to determine the original numeric sequences. The location of the MasterCode within the MasterGrid is the only item that a user must memorize in order to retain security. Optionally a SecureWord system user can memorize their SecureWords and even their unique MasterCode for enhanced security.

TABLE 9

| L/0 | R/1 | M/2 | N/3 | T/4 |
|---|---|---|---|---|
| A/ | H/ | Q/ | D/ | U/ |
| S/5 | P/6 | V/7 | K/8 | C/9 |
| W/ | B/ | I/ | Y/ | E/ |
| F/ | Z/ | G/ | J/ | O/ |

The actually arrangement of the MasterCode within the MasterGrid can be almost unlimited, with the MasterCode being embedded vertically, which is shown in Table 10, as well as horizontally, which was shown in Table 9, embedded in alternating locations which is shown in Table 11, diagonally, as well as various other permutations and other sequences.

TABLE 10

| L/0 | A/ | W/ | F/ | S/5 |
|---|---|---|---|---|
| R/1 | H/ | Q/ | D/ | P/6 |
| M/2 | U/ | E/ | O/ | V/7 |
| N/3 | B/ | I/ | Y/ | K/8 |
| T/4 | Z/ | G/ | J/ | C/9 |

TABLE 11

| L/0 | H/ | R/1 | D/ | M/2 |
|---|---|---|---|---|
| A/ | N/3 | Q/ | T/4 | U/ |
| S/5 | B/ | P/6 | Y/ | V/7 |
| W/ | K/8 | I/ | C/9 | E/ |
| F/ | Z/ | G/ | J/ | O/ |

The SecureWords "SHORT ROAR", "LOOSE NOOSE", "STREAKY", "ACNE ZIT" and "NO MORE CHOO-CHOO" represent particular numeric sequences. In this particular MasterCode, no vowels are used.

Referring to Table 8 in conjunction with Table 9 (or optionally Tables 10 or 11), the sequence used to simply decode the SecureWords can easily be seen. In the actual decoding, first vowels, stray consonants and stray symbols are removed. Then the remaining letters are related back to the original digit. Referring to Table 12 this two step process is shown.

TABLE 12

| SecureWord | Encrypted Sequence | Numeric Sequence |
|---|---|---|
| SHORT ROAR | SRTRR | 51411 |
| LOOSE NOOSE | LSNS | 0535 |
| STREAKY | STRK | 5418 |
| ACNE ZIT | CNT | 934 |
| NO MORE CHOO-CHOO | NMRCC | 32199 |

The SecureWord system user can also alias letters. In one example, if the letter Z is an alias for S then ACNE ZIT would become CNST and decode to 9354. The complexity of aliasing is limited only my the user. The aliasing would result in a compression on decoding (Z and S both map to S) and an expansion in encryption (S mapping to both S and Z).

Referring to FIG. 1 there is shown a flow chart of the steps involved in the SecureWord system for generating a MasterCode and a MasterGrid. In step 10 a unique MasterCode is generated. The generation is done in two sub-steps. In sub-step 12 a set of ten characters are selected. The selected characters should contain at least seven consonants. The actual selection may be chosen to optimize the generation of multiple words, may be random, or have a particular meaning. In sub-step 14 the system randomly associates each selected character with a corresponding digit. The association of the selected characters should be tested to reject an obvious relationship such as the letter/number arrangement on a telephone dial or in any of the various memory aid systems described herein. In step 20 a unique MasterGrid is generated. The generation is done in three sub-steps. In sub-step 22 a grid size is selected. While the examples are for square grids, the grid may be an n by m rectangle or other shape. In sub-step 24 a method for embedding the MasterCode is selected. In sub-step 26 the remaining entries of the MasterGrid which do not contain the embedded MasterCode are filled.

Referring to FIG. 2 there is shown a flow chart of the steps involved in the SecureWord system for generating a SecureWord. In step 30 a SecureWord is generated using the MasterCode. In sub-step 32 a numeric sequence is translated into the corresponding characters of the MasterCode. In sub-step 34 the letter sequence is expanded into an ordinary English word. If at least three SecureWords are not created, the group of characters will be broken into smaller groupings with the smallest group being three letters, so as to produce at least three words expanded from each sub group.

If six SecureWords or sets of SecureWords are not yet produced, the number of characters in each group is altered until at least six expanded words are available.

Referring to FIG. 3 there is shown a flow chart of the steps involved in the SecureWord system for decoding a SecureWord. In step 40 a particular SecureWord is decoded in three sub-steps. In sub-step 42 the MasterCode is located within the MasterGrid. In sub-step 44 extraneous characters such as vowels, stray consonants and stray symbols are removed. In sub-step 46 the reduced consonant sequence is then translated, using the MasterCode within the MasterGrid, into the original numeric sequence.

Figure 4:
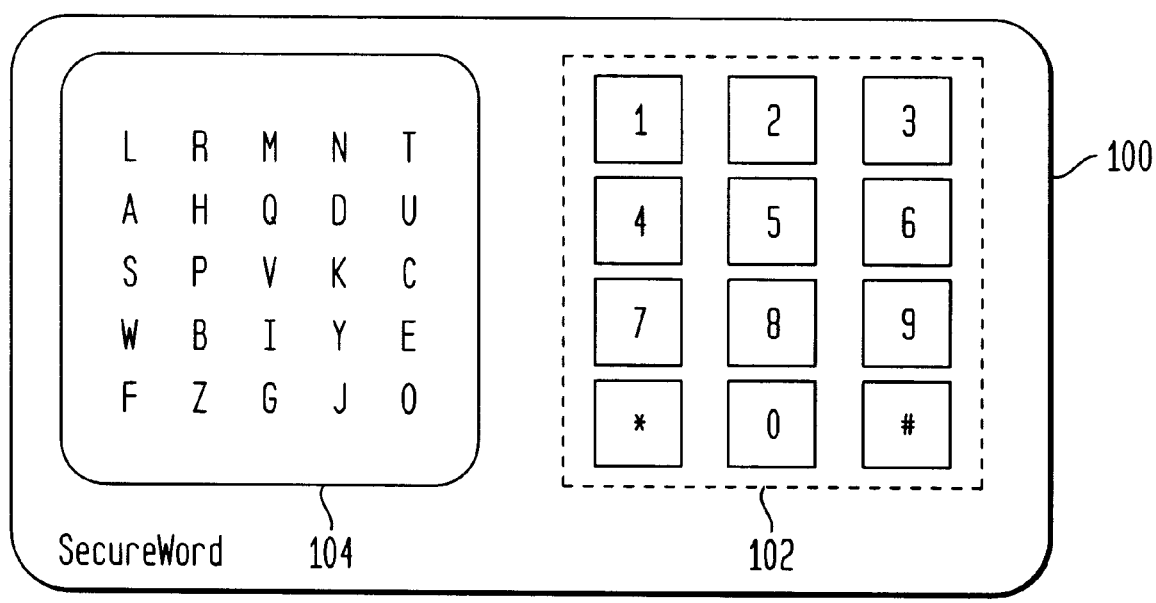
FIG. 4 is a diagram of a representative embodiment of a SecureWord computer.

Referring to FIG. 4 there is shown a block diagram of a SecureWord computer system. The SecureWord computer system can be implemented on a general purpose computer, a specialized computer system or even on a chip level. A hand held SecureWord computer 100 can be used to generate the MasterCode and MasterGrid. While the particular embodiment is shown with only a numeric keypad 102, it can easily be expanded to a full alpha-numeric keypad. The SecureWord computer 100 has an integral display 104 sufficiently large to show the MasterGrid. After a MasterCode and a MasterGrid is generated and permanently stored within internal memory, the SecureWord permits entry of a numeric sequence. The numeric sequence is then translated and a word list lookup is provided. This lookup then permits the expansion of the consonant sequences into ordinary English. The selection of ordinary English words are then shown on the display. To decode a SecureWord the user selects the display of the permanently stored MasterGrid on the integral display 104 of the SecureWord computer 100. The user then determines how the MasterCode is embedded into the MasterGrid that is being displayed. Thus permitting the decoding of the SecureWord into the original numeric sequence.

While the SecureWord computer 100 is described as a hand held computer, it can equally well be implemented on a general purpose computer as well as be accessed over the Internet with the MasterGrid being printed. A user would only have to access the program to generate a new SecureWord for a new numeric sequence.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for securing passwords and personal identification numbers comprising the following steps:
   selecting a subset of at least ten characters from an available set of characters;
   randomly associating said selected subset of at least ten characters to a corresponding digit, wherein said association defines a mastercode;
   translating a numeric sequence into a corresponding character sequence using said mastercode; and
   interspersing additional characters among said corresponding character sequence to form at least one natural language word.

2. The method as recited in claim 1 further comprising the step of embedding said mastercode into a mastergrid and filling remaining entries of said mastergrid with characters thereby camouflaging said mastercode within said mastergrid.

3. The method as recited in claim 2 wherein said mastergrid is a rectangular grid.

4. The method as recited in claim 3 wherein said mastergrid is a square grid.

5. The method as recited in claim 4 wherein said mastergrid is a five by five grid.

6. The method as recited in claim 4 wherein said mastergrid is a six by six grid.

7. The method as recited in claim 1 wherein said at least one actual word is a word in a character based language.

8. The method as recited in claim 7 wherein said character based language is English and said set of available characters includes the alphabet.

9. The method as recited in claim 1 wherein at least seven of said subset of at least ten characters are consonants.

10. The method as recited in claim 1 further comprising the following steps:
    removing extraneous characters from said at least one natural language word to produce a reduced sequence of characters; and
    decoding said reduced set of characters using said mastercode.

11. The method as recited in claim 2 further comprising the following steps:
    locating said mastercode embedded in said mastergrid;
    removing extraneous characters from said at least one natural language word to produce a reduced sequence of characters; and
    decoding said reduced set of characters using said mastercode.

12. A system for securing passwords and personal identification numbers with a mastercode having ten characters, selected from an available set of characters, each said selected character being associated with a unique one of ten digits, the system comprising:
    means for embedding the mastercode in a mastergrid thereby camouflaging the mastercode within said mastergrid;
    translator for translating a numeric sequence representing a password or personal identification number into a corresponding character sequence using the mastercode; and
    means for interspersing additional characters among said corresponding character sequence to form at least one natural language word.

13. The system as recited in claim 12 further comprising means for filling remaining entries of said mastergrid with characters.

14. The system as recited in claim 12 wherein said mastergrid is a rectangular grid.

15. The system as recited in claim 12 wherein said mastergrid is a square grid.

16. The system as recited in claim 15 wherein said mastergrid is a five by five grid.

17. The system as recited in claim 15 wherein said mastergrid is a six by six grid.

18. The system as recited in claim 12 wherein said at least one natural language word is a word in a character based language.

19. The system as recited in claim 18 wherein said character based language is English and said set of available characters includes the alphabet.

20. The system as recited in claim 12 wherein at least seven of the ten characters are consonants.

21. A device for securing passwords and personal identification numbers comprising:

a generator for creating a mastercode having ten characters, selected from a set of available characters, said selected characters being randomly associated with unique ones of ten digits;

means for embedding the mastercode in a mastergrid thereby camouflaging the mastercode within said mastergrid;

translator for translating a numeric sequence representing a password or personal identification number into a corresponding character sequence using the mastercode; and means for creating a word list related to said numeric sequence by interspersing sets of additional characters among said corresponding character sequence to form at least two natural language words.

22. The device as recited in claim 21 further comprising means for filling remaining entries of said mastergrid with characters.

23. The device as recited in claim 21 wherein said mastergrid is a rectangular grid.

24. The device as recited in claim 21 wherein said at least one word is a word in a character based language.

25. The device as recited in claim 24 wherein said character based language is English and said set of available characters includes the alphabet.

26. The device as recited in claim 21 wherein at least seven of said ten characters are consonants.

27. A device for securing passwords and personal identification numbers comprising:

a computer having a list of natural language words stored therein;

said computer being under the control of software to:

generate a mastercode having ten characters, selected from a set of available characters, each of said selected characters being randomly associated uniquely with one of ten digits;

translate a numeric sequence representing a password or personal identification number into a corresponding character sequence using the mastercode; and select at least one natural language word corresponding to said character sequence by scanning said list for natural language words having said character sequence contained therein.

28. The device of claim 27 wherein said selected natural word includes additional characters interspersed in said character sequence.

29. The device of claim 27 wherein said selected natural word includes additional characters added in said character sequence.

30. A method for securing passwords and personal identification numbers comprising the following steps:

selecting a subset from an available set of characters equal to the number of possible digits in a number system;

randomly associating each character of said selected subset to a digit, wherein said association defines a mastercode;

translating a numeric sequence into a corresponding character sequence using said mastercode; and adding additional characters among said corresponding character sequence to form at least one natural language word.

31. The method according to claim 30 wherein said number system is the decimal system and said mastercode includes ten characters.

* * * * *